June 23, 1936. C. A. LAEMMEL 2,045,327
METHOD OF MAKING CLAMPS
Filed Oct. 15, 1934
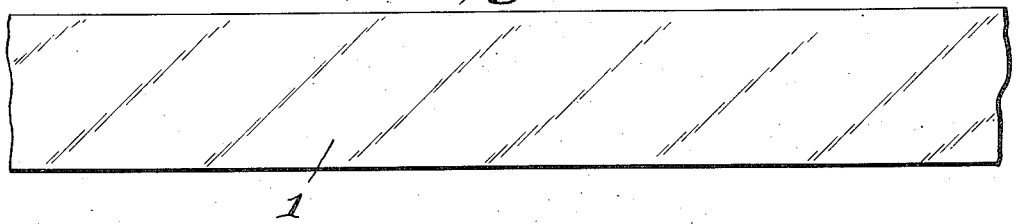
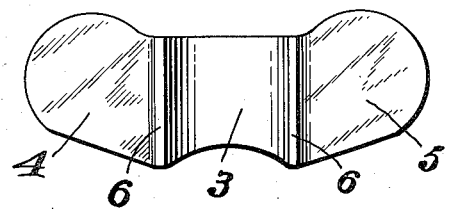
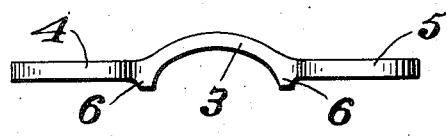
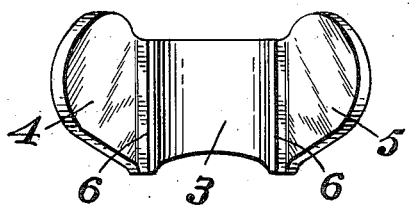
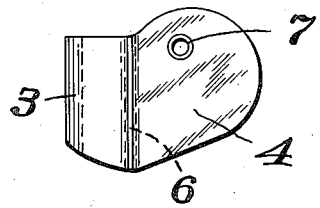
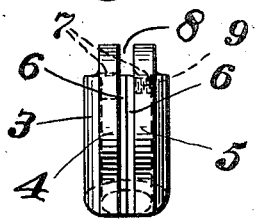
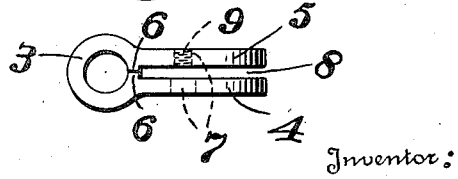
Inventor:
Charles A. Laemmel,
By Parker Cook
Attorney.

Patented June 23, 1936

2,045,327

UNITED STATES PATENT OFFICE 2,045,327

METHOD OF MAKING CLAMPS

Charles A. Laemmel, Brooklyn, N. Y., assignor to Atlantic Service Company, Inc., Brooklyn, N. Y., a corporation of New York Application October 15, 1934, Serial No. 748,407

2 Claims. (Cl. 29—148)

My invention relates to new and useful improvements in the method of making clamps, and more particularly to a method of making a clamp that is used as a "cam" in connection with a hack or meat saw, wherein a key is to be placed in a portion of the clamp so that the same may be revolved to hold the saw in its tightened position.

Heretofore, clamps of this type have been made from steel castings or drop forgings, the hub of the clamp being then drilled and reamed and the wings of the clamp formed by milling a slot vertically of the forgings so that a saw blade could be inserted between the resultant wings.

Clamps made in this manner are expensive, due to the cost of the drilling and milling operations. Furthermore, it is desirable to make these clamps out of stainless metal and a considerable portion of the metal is wasted, because the drilled hollow hub is relatively large and cutting the slot between the wings wastes more metal. Thus, considerable metal of the forging is entirely wasted and this, added to the expense of the machining, makes the article relatively expensive.

One of the objects of the present invention, therefore, is to form this clamp of a stainless steel, but rather than casting or forging the same and then performing the different expensive machining operations and wasting a considerable portion of the metal, I utilize a piece of bar stock and forge the clamps directly from this stock in suitable dies. The stock is, of course, heated and struck up between drop hammer dies and the operation continued until the stock is used up, the unheated section of the bar serving as a handle for the operator to manipulate the heated end between the forging dies.

The dies are so formed that the bridge of the clamp, that is, the portion between the wings, will be thinned during the operation, thus forcing the metal of the bridge into two parallel outstanding lugs at the extremities of the bridge.

The blank is then afterwards bent to its final shape, the bridge being bent to form a circular hub, and the lugs now contacting and, in turn, forming what might be termed "spacers", so that the wings will now be in parallel alignment with each other and, at the same time, so spaced that a saw blade may be conveniently held between the wings. The hub now acts as a receptacle for a handle or key which may be inserted in the hub to turn the cam or clamp and the key afterwards removed.

Still another object of the invention is to form this clamp or, as spoken of in the trade, "cam" from metal blanks of the desired thickness, so that the only machining operation will be the drilling and threading of a small hole in the wings, thus doing away with the expensive drilling of the hub and the slotting, at the same time utilizing all of the metal rather than wasting a considerable portion of the same, as heretofore explained.

With these and other objects in view, the invention consists in certain new and novel methods of making clamps, as will be hereinafter more fully explained and pointed out in the claims.

In the drawing showing a preferred embodiment,

Fig. 1 shows a stock bar from which the clamp blanks are forged;

Fig. 2 is a side view of the bar;

Fig. 3 shows the forged blank after it has been operated on by the hammers (not shown);

Fig. 4 is an edge view of the forged blank;

Fig. 5 is a view of the formed clamp partly closed to shape;

Fig. 6 is a side view of the completed clamp;

Fig. 7 is a top plan view thereof, as seen in Fig. 6; and

Fig. 8 is an edge view of the completed clamp, as seen in Fig. 7.

Referring now more particularly to the several views, there is shown in Fig. 1 a bar of stock I which might be flat or round and may be of a stainless steel or any other desirable metal, and it will be understood that the operator will hold one end of the stock and subject the heated end to the hammer dies (not shown).

In Fig. 3, there is shown a blank forged to shape, the forging now comprising the unfinished clamp and having what I term a "bridge" 3 and two oppositely located similar wings 4 and 5.

It will be noticed also that in forging the blank, a part of the metal is displaced from what I term the "bridge" 3 to form the two parallel transverse lugs 6, as may be clearly seen from the several views.

After the blanks have been forged flat (hot), they will be bent to their final form (cold), as shown in the views 6 to 8 inclusive.

In Fig. 5, I have shown the wings 4 and 5 during the time of their bending operation, while Fig. 6 shows the clamp or cam now in its final bent form.

After the clamp has been bent to its final position, the small holes 7 are drilled through the wings and, of course, the holes will be in perfect alignment.

Referring for the moment to Fig. 7, for the sake of clearness it will be seen that the bridge 3 now forms the circular hollow hub and that the two transverse lugs 6 will contact throughout their length. Although the hub might be said to be split, still the strength of the metal is such that this in no way interferes with the strength or utility of the clamp.

Furthermore, these lugs 6, as will be noticed in Fig. 7, act as "spacers" so that the wings 4 and 5 are now in parallel alignment throughout their length but with the resultant slot or space 8 therebetween, in which space is to be inserted a saw blade (not shown).

The only machining operation necessary, therefore, in the manufacture of this clamp will be to drill the holes 7 and thread one of the openings 7, as at 9, so that a small screw may be passed through an intermediate sliding bolt onto which the saw blade is hooked (not shown).

When the clamps are made in this way, it will be seen that the only metal wasted will be the metal stamped out from the original blank and this may be utilized as scrap so that it might be truthfully said that all of the metal is utilized.

Furthermore, it will also be seen that there are no expensive machining operations, such as have heretofore been necessary in the drilling and reaming of a hub and in the milling of the slot to form the space or, in reality, to form the wings.

Again, stainless steel is often a hard steel and rather difficult to machine, necessitating expensive set-ups of machines for performing the machining operation and the use of high speed steel tools for cutter and drills.

It will also be seen that the ratio of the weight between the forging and the finished cam is practically the same, thereby not only saving on the machining operations but also the saving of the rather expensive metal.

From the foregoing, it will be seen that I have devised a new and novel method of forming these clamps which consists in forcing the metal from the bridge portion into two transverse lugs, which, when bent into contact with each other, complete the circular hub and, at the same time, act as "spacers", so that the wing portions will be in parallel alignment and be so spaced that a saw blade can conveniently be fitted therein and the hub formed to receive a detachable key. Finally, by forming the clamp in this manner the heretofore expensive machining operations are all dispensed with.

It will be understood that I do not wish to limit myself to the exact shape shown, as these clamps might equally as well be forged in other shapes without departing from the spirit and scope of the invention.

Having thus described my invention, what I claim as new and desire to secure by Letters Patent is:

1. The method of forming a clamp for hack saws and the like which consists in the formation of blanks, forging said blanks while hot to form a clamp with outstanding wings and a connecting bridge, forcing a portion of the metal of the bridge into two transverse oppositely located lugs extending in a plane to one side of the plane of the wings, bending the bridge and wings until the spacers contact throughout their length to thereby form a hollow hub, the lugs forming a rear wall and acting as spacers for the wings whereby the wings will be slightly separated and in parallel alignment with each other and finally drilling aligned openings in said wings.

2. A method of forming clamps and the like from bar stock which includes forging a bridge and two oppositely located wings, forcing metal from the bridge to form lugs at the extremities of the bridge and in a plane to one side of the plane of the wings, bending the wings towards each other to form a resultant circular split hub adapted to receive a detachable key, the lugs forming spacing means between the wings so that the latter will be in parallel spaced alignment and finally drilling aligned openings in said wings.

CHARLES A. LAEMMEL.